United States Patent
Liu

(10) Patent No.: US 12,265,819 B2
(45) Date of Patent: Apr. 1, 2025

(54) CODE UPDATING METHOD AND APPARATUS, ELECTRONIC DEVICE, AND NON-VOLATILE COMPUTER-READABLE STORAGE MEDIUM

(71) Applicant: SUZHOU METABRAIN INTELLIGENT TECHNOLOGY CO., LTD., Jiangsu (CN)

(72) Inventor: Bo Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,351

(22) PCT Filed: Dec. 27, 2022

(86) PCT No.: PCT/CN2022/142511
§ 371 (c)(1),
(2) Date: Jun. 26, 2024

(87) PCT Pub. No.: WO2023/213093
PCT Pub. Date: Nov. 9, 2023

(65) Prior Publication Data
US 2025/0060954 A1    Feb. 20, 2025

(30) Foreign Application Priority Data
May 5, 2022   (CN) .............................. 202210477825

(51) Int. Cl.
*G06F 8/65* (2018.01)
(52) U.S. Cl.
CPC ..................... *G06F 8/65* (2013.01)

(58) Field of Classification Search
USPC ........................................................ 717/168
See application file for complete search history.

(56) References Cited

U.S. PATENT DOCUMENTS 6,466,999 B1    10/2002   Sliger et al.
10,956,308 B2 *  3/2021   Liemandt ............ G06F 11/3672
(Continued)

FOREIGN PATENT DOCUMENTS

CN    108572834 A    9/2018
CN    108874438 A    11/2018
(Continued)

OTHER PUBLICATIONS

International Search Report and Written Opinion for PCT/CN2022/142511 (Feb. 25, 2023).

*Primary Examiner* — Bradley A Teets
*Assistant Examiner* — Clint Thatcher
(74) *Attorney, Agent, or Firm* — Merchant & Gould P.C.

(57) ABSTRACT

Disclosed are a code updating method and apparatus, an electronic device, and a Non-Volatile computer-readable storage medium. The method comprises: acquiring a target character string, wherein the target character string is a common code of source codes of at least two products, first line spacings in the source codes of the at least two products are the same; matching the target character string with source codes of a first product, and taking a line where a character string, that matches the target character string, in the first product is located as a first line of first target codes of the first product; generating a patch file for the first target codes of the first product; and respectively applying the patch file to the first target codes of the at least two products.

20 Claims, 15 Drawing Sheets

(56) References Cited

U.S. PATENT DOCUMENTS

| | | | |
|---|---|---|---|
| 2004/0250245 A1* | 12/2004 | Rao | G06F 8/65 |
| | | | 717/172 |
| 2005/0044294 A1* | 2/2005 | Vo | H03M 7/30 |
| | | | 710/1 |
| 2012/0144380 A1 | 6/2012 | Rabeler et al. | |
| 2024/0289122 A1* | 8/2024 | Salarios | G06F 8/658 |

FOREIGN PATENT DOCUMENTS

| CN | 111008034 A | 4/2020 |
|---|---|---|
| CN | 112711435 A | 4/2021 |
| CN | 113778398 A | 12/2021 |
| CN | 114371870 A | 4/2022 |
| CN | 114579168 A | 6/2022 |

* cited by examiner

Fig. 6

```
1    #include <stdio.h>
2
3    void childfunction()
4    {
5        printf("this is product 2 childfunction\r\n");
6        printf("it takes 2 lines\r\n");
7    }
8
9    void publicfunction()
10   {
11       printf("public function version 1\r\n");
12   }
13
14   main()
15   {
16       printf("this is in mian function\r\n");
17   }
```

Fig. 7

```
1    #include <stdio.h>
2
3    void childfunction()
4 ⊞ {
8
9    void publicfunction()
10 ⊞ {
13
14   main()
15 ⊞ {
```

Fig. 8

| P2_source_v01.c | |
|---|---|
| # include <stdio.h><br>📄 childfunction<br>📄 publicfunction<br>📄 main | `#include <stdio.h>`<br><br>`void childfunction()`<br>`{`<br>`    printf("this is product 2 childfunction\r\n");`<br>`    printf("it takes 2 lines\r\n");`<br>`}`<br><br>`void publicfunction()`<br>`{`<br>`    printf("public function version 1\r\n");`<br>`}`<br>`main()`<br>`{`<br>`    printf("this is in mian function\r\n");`<br>`}` |

Fig. 11

```
$ diff p1_source_v01.c p1_source_v02.c
10c10
<        printf("public function version 1\r\n");
---
>        printf("public function version 2\r\n");
```

Fig. 12

```
$ paradiff p1_source_v01.c p1_source_v02.c
##parastart##
void publicfunction()
##paraend
3c3
<        printf("public function version 1\r\n");
---
>        printf("public function version 2\r\n");
```

CODE UPDATING METHOD AND APPARATUS, ELECTRONIC DEVICE, AND NON-VOLATILE COMPUTER-READABLE STORAGE MEDIUM

CROSS-REFERENCE TO RELATED APPLICATION

The present application is a National Stage filing under 35 U.S.C. § 371 of International Application number PCT/CN2022/142511, filed Dec. 27, 2022, which claims priority to Chinese Patent Application No. 202210477825.7, filed to the China National Intellectual Property Administration on May 5, 2022 and entitled "Code updating method and apparatus, electronic device, and Non-Volatile computer-readable storage medium", which is incorporated herein by reference in its entirety.

TECHNICAL FIELD

The present disclosure relates to the technical field of development of coded products, and in particular, to a code updating method and apparatus, an electronic device, and a Non-Volatile computer-readable storage medium.

BACKGROUND

In the development process of a server series product line, current code synchronization method is tedious and inefficient. Specifically, the server series product line includes a plurality of products; the plurality of products use a same basic code base (Codebase), codes of the plurality of products are largely identical but with minor differences, and the plurality of products have a large amount of common codes, the same directory structure file name, and only a small amount of codes are unique to each product. In the development process, if a common code part of the plurality of products needs to be modified, regarding each product, it is necessary to use a diff (a tool for generating a difference file (patch) under the Linux system) command to generate a patch (a tool for generating codes of the latest version according to the difference file (patch) under the Linux system) file, and then each patch file is applied to source codes of a corresponding product respectively, so as to modify the corresponding product. Such a manner of synchronously updating codes is tedious and inefficient.

SUMMARY

In view of this, embodiments of the present disclosure provide a code updating method and apparatus, an electronic device, and a Non-Volatile computer-readable storage medium, so as to solve the problem that synchronous updating of codes is tedious and inefficient in a development process of series product lines using a same basic code base.

According to a first aspect, embodiments of the present disclosure provide a code updating method, includes:
 a target character string is acquired, wherein the target character string is a common code of source codes of at least two products, first line spacings in the source codes of the at least two products are the same, and each of the first line spacings is a spacing between a line where the target character string is located and a first line of codes to be modified;
 the target character string is matched with source codes of a first product, and a line where a character string, that matches the target character string, in the first product is located is taken as a first line of first target codes of the first product; wherein the first product is one of the at least two products, and the first target codes at least further include the codes to be modified and codes between the first line and the codes to be modified;
 a patch file is generated for the first target codes of the first product; and
 the patch file is respectively applied to the first target codes of the at least two products.

In combination with the first aspect, in a first embodiment of the first aspect, the target character string includes all or some characters in one code structure block, and the some characters are continuous characters in the code structure block.

In combination with the first embodiment of the first aspect, in a second embodiment of the first aspect, the target character string is acquired includes:
 N code structure blocks prior to a first line of the codes to be modified are acquired, wherein N is a positive integer;
 whether the N code structure blocks are first code structure blocks is determined, wherein the first code structure blocks are common code structure blocks of the source codes of the at least two products, and line spacings between the first code structure blocks and the codes to be modified in the source codes of the at least two products are the same; and
 all or some characters within one of the first code structure blocks are determined as the target character string.

In combination with the first embodiment of the first aspect, in a third embodiment of the first aspect, the target character string is acquired includes:
 step S101: a second code structure block that precedes and is immediately adjacent to the first line of the codes to be modified is acquired;
 step S102: whether the second code structure block satisfies a first condition is determined, wherein the first condition includes: the second code structure block is a common code structure block of the source codes of the at least two products, and line spacing between the second code structure block and the codes to be modified is the same in the source codes of the at least two products;
 step S103: in cases where the second code structure block satisfies the first condition, all or some characters within the second code structure block are determined as the target character string;
 step S104: in cases where the second code structure block does not satisfy the first condition, a code structure block which precedes the second code structure block and is immediately adjacent to the second code structure block is acquired as a new second code structure block; and
 the steps S102-S104 are repeated until a code structure block that satisfies the first condition is acquired, and all or some characters in the code structure block that satisfies the first condition are determined as the target character string.

In combination with the first aspect, in a fourth embodiment of the first aspect, the patch file is respectively applied to the first target codes of the at least two products includes:
 the target character string is matched with source codes of a second product of the at least two products;
 a line in the second product where codes matching the target character string are located is determined as the first line of the first target codes; and starting from the first line of the first target codes, according to a line to be modified indicated in the patch file, the line where the codes to be modified are located is positioned and modified.

In combination with the first aspect, in a fifth embodiment of the first aspect, the at least two products use the same basic code base;

before the target character string is acquired, the method further includes:

the source codes of the at least two products are segmented respectively by using the same segmentation tool or the same segmentation standard, to obtain a plurality of code segments;

the target character string is acquired from a code segment where the codes to be modified are located;

the target character string is matched with source codes of the first product, and the line where the character string, that matches the target character string, in the first product is located is taken as the first line of first target codes of the first product includes:

a code segment where the codes to be modified are located in the source codes of the first product is identified;

the target character string is matched with the code segment where the codes to be modified are located in the first product; and a line where codes matching the target character string are located in the code segment where the codes to be modified are located in the first product is determined as the first line of the first target codes, wherein the first target codes further include: all codes following the line where the codes matching the target character string are located in the code segment where the codes to be modified are located in the first product.

In combination with the fifth embodiment of the first aspect, in a sixth embodiment of the first aspect, the patch file is respectively applied to the first target codes of the at least two products includes:

for the source codes of each of the products, the code segment where the codes to be modified are located is identified;

the target character string is matched with the code segment where the codes to be modified are located;

a line where codes matching the target character string are located in the code segment where the codes to be modified are located is determined as the first line of the first target codes; and starting from the first line of the first target codes, according to a line to be modified indicated in the patch file, the line where the codes to be modified are located is positioned and modified.

According to a second aspect, embodiments of the present disclosure provide a code updating apparatus, includes:

an acquisition module, configured to acquire a target character string, wherein the target character string is a common code of source codes of at least two products, first line spacings in the source codes of the at least two products are the same, and each of the first line spacings is a spacing between a line where the target character string is located and a first line of codes to be modified;

a matching module, configured to match the target character string with source codes of a first product, and take a line where a character string, that matches the target character string, in the first product is located as a first line of first target codes of the first product; wherein the first product is one of the at least two products, and the first target codes at least further include the codes to be modified and codes between the first line and the codes to be modified;

a generation module, configured to generate a patch file for the first target codes of the first product; and a patch file applying module, configured to respectively apply the patch file to the first target codes of the at least two products.

In combination with the second aspect, in a first embodiment of the second aspect, the target character string includes all or some characters in one code structure block, and the some characters are continuous characters in the code structure block.

In combination with the first embodiment of the second aspect, in a second embodiment of the second aspect, the acquisition module includes:

a first acquisition unit, configured to acquire N code structure blocks prior to the first line of the codes to be modified, wherein N is a positive integer;

a first judgment unit, configured to determine whether the N code structure blocks are first code structure blocks, wherein the first code structure blocks are common code structure blocks of the source codes of the at least two products, and line spacings between the first code structure blocks and the codes to be modified in the source codes of the at least two products are the same; and a first determination unit, configured to determine all or some characters within one of the first code structure blocks as the target character string.

In combination with the first embodiment of the second aspect, in a third embodiment of the second aspect, the acquisition module includes:

a second acquisition unit, configured to acquire a second code structure block that precedes and is immediately adjacent to the first line of the codes to be modified;

a second judgment unit, configured to determine whether the second code structure block satisfies a first condition, wherein the first condition includes: the second code structure block is a common code structure block of the source codes of the at least two products, and line spacing between the second code structure block and the codes to be modified is the same in the source codes of the at least two products;

a second determination unit, configured to determine, in cases where the second code structure block satisfies the first condition, all or some characters within the second code structure block as the target character string;

a third acquisition unit, configured to acquire, in cases where the second code structure block does not satisfy the first condition, a code structure block which precedes the second code structure block and is immediately adjacent to the second code structure block as a new second code structure block; and a control unit, configured to control the second judgment unit, the second determination unit, and the third acquisition unit to repeatedly run, until a code structure block that satisfies the first condition is obtained, and to determine all or some characters in the code structure block that satisfies the first condition as the target character string.

In combination with the second aspect, in a fourth embodiment of the second aspect, the patch file applying module includes:

a first matching unit, configured to match the target character string with source codes of a second product of the at least two products;

a third determination unit, configured to determine a line in the second product where codes matching the target character string are located as the first line of the first target codes; and a first modification unit, configured to position and modify the line where the codes to be modified are located starting from the first line of the first target codes according to a line to be modified indicated in the patch file.

In combination with the second aspect, in a fifth embodiment of the second aspect, the at least two products use the same basic code base;

the apparatus further includes:

a segmentation module, configured to segment the source codes of the at least two products respectively by using the same segmentation tool or the same segmentation standard, to obtain a plurality of code segments;

the target character string is acquired from a code segment where the codes to be modified are located;

the matching module includes:

a first identification unit, configured to identify a code segment where the codes to be modified are located in the source codes of the first product;

a second matching unit, configured to match the target character string with the code segment where the codes to be modified are located in the first product; and a fourth determination unit, configured to determine a line where codes matching the target character string are located in the code segment where the codes to be modified are located in the first product as the first line of the first target codes, wherein the first target codes further include: all codes following the line where the codes matching the target character string are located in the code segment where the codes to be modified are located in the first product.

In combination with the fifth embodiment of the second aspect, in a sixth embodiment of the second aspect, the patch file applying module includes:

a second identification unit, configured to identify, for the source codes of each of the products, the code segment where the codes to be modified are located;

a third matching unit, configured to match the target character string with the code segment where the codes to be modified are located;

a fifth determination unit, configured to determine a line where codes matching the target character string are located in the code segment where the codes to be modified are located as the first line of the first target codes; and a second modification unit, configured to position and modify the line where the codes to be modified are located starting from the first line of the first target codes according to a line to be modified indicated in the patch file.

According to a third aspect, embodiments of the present disclosure provide an electronic device, includes:

a memory and a processor, wherein the memory and the processor are in communication connection with each other; the memory is configured to store a computer program; and when the computer program is executed by the processor, the code updating method of the first aspect or any embodiment of the first aspect is implemented.

According to a fourth aspect, embodiments of the present disclosure provide a Non-Volatile computer-readable storage medium, the Non-Volatile computer-readable storage medium is configured to store a computer program; when the computer program is executed by a processor, the code updating method of the first aspect or any embodiment of the first aspect is implemented.

BRIEF DESCRIPTION OF THE DRAWINGS

The features and advantages of some embodiments of the present disclosure will be more clearly understood with reference to the drawings, which are schematic and should not be construed as limiting some embodiments of the present disclosure, wherein:

FIG. 6 is a schematic diagram of codes before folding when segmenting source codes by using notepad++ according to embodiments of the present disclosure;

FIG. 7 is a schematic diagram of codes after folding when segmenting the source codes as shown in FIG. 6 by using notepad++;

FIG. 8 is a schematic diagram after segmenting the source codes as shown in FIG. 6 by using source insight;

FIG. 11 is a schematic diagram of a patch file generated regarding modification of source codes of the example product p1 in the related art;

FIG. 12 is a schematic diagram of a patch file generated regarding modification of source codes of the example product p1 by using techniques provided in embodiments of the present disclosure;

DETAILED DESCRIPTION OF THE EMBODIMENTS

To make the objects, methods and advantages of embodiments of the present disclosure clearer, hereinafter, the embodiments in embodiments of the present disclosure will be described clearly and thoroughly in combination with the drawings in the embodiments of the present disclosure. Apparently, the embodiments as described are merely some rather than all of the embodiments of the present disclosure. All other embodiments obtained by a person of ordinary skill in the art on the basis of the embodiments of the present disclosure without any inventive effort shall all fall within the scope of protection of some embodiments of the present disclosure.

Embodiments of the present disclosure can not only be applicable to synchronously updating codes in a development process of a server series product line, but can also be applicable to synchronously updating codes in a development process of other series product lines using the same basic code base.

In addition, terms "first" and "second", etc. are only used for descriptive purposes, and cannot be understood as indicating or implying relative importance or implicitly indicating the number of indicated technical features. In the illustration of the following various embodiments, the meaning of "a plurality of" is two and more, unless explicitly defined otherwise.

Figure 1:
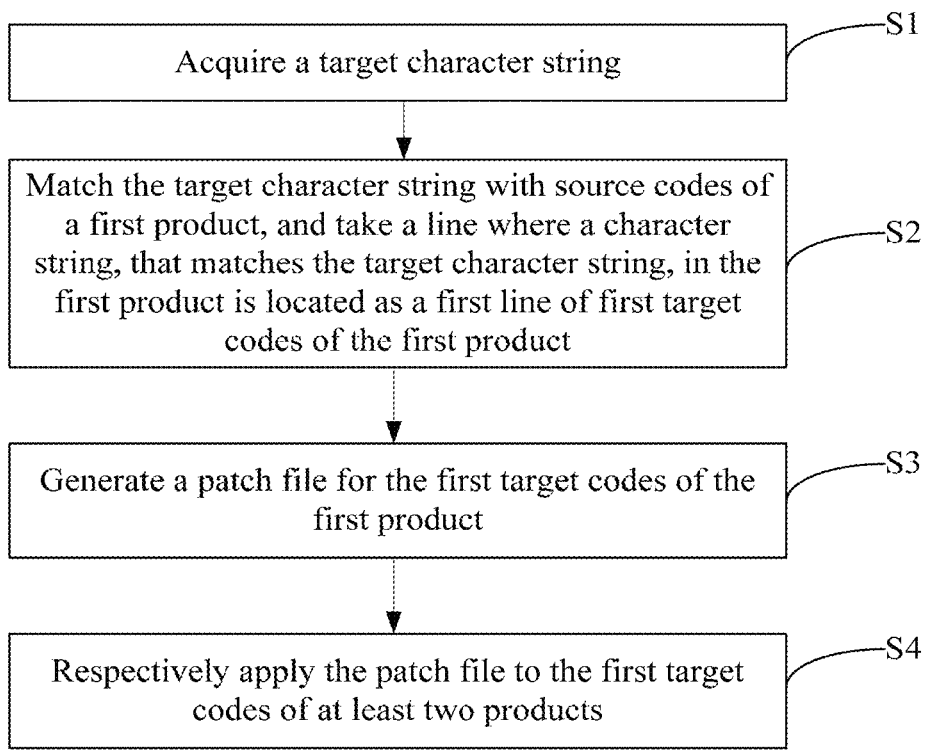
FIG. 1 is a schematic flowchart of a code updating method provided according to embodiments of the present disclosure.

As shown in FIG. 1, which is a schematic flowchart of a code updating method provided according to embodiments of the present disclosure, the method includes:

step S1: a target character string is acquired, wherein the target character string is a common code of source codes of at least two products, first line spacings in the source codes of the at least two products are the same, and each of the first line spacings is a spacing between a line where the target character string is located and a first line of codes to be modified;

wherein there may be no code or there may also be at least one lines of codes between the line where the target character string is located and the first line of the codes to be modified, and first target codes between the line where the target character string is located and the first line of the codes to be modified may be the same and may also be different.

step S2: the target character string is matched with source codes of a first product, and a line where a character string, that matches the target character string, in the first product is located is taken as a first line of the first target codes of the first product; wherein the first product is one of the at least two products, and the first target codes at least further include the codes to be modified and codes between the first line and the codes to be modified.

Certainly, the first target codes of the first product may also include codes of the line where the character string in the first product that matches the target character string is located, and all codes following said line. Herein, matching refers to being completely same, and the character string matching the target character string is a character string same as the target character string.

step S3: a patch file is generated for the first target codes of the first product.

In some embodiments, the patch file may be generated by using a diff command.

step S4: the patch file is respectively applied to the first target codes of the at least two products, so as to complete synchronous update of the source codes of the at least two products.

In some embodiments, when the patch file is respectively applied to the first target codes of the at least two products, a process of applying the patch file for each product may be: the target character string is matched with source codes of the product, and a line (i.e. a first line of the first target codes of the product) in the product where a character string matching the target character string is located is taken as a start line of applying the patch file.

In the embodiments of the present disclosure, when generating the patch file and applying the patch file, the comparison does not start from the first line of the whole source codes of the product, but starts from the line where a specified character string (i.e. the target character string) is located; furthermore, the selection of the specified character string follows the condition that the specified character string includes common codes of a plurality of series products, and line spacings between lines where the specified character string is located in the plurality of series products and a first line of the codes to be modified are the same, thereby avoiding the problem of comparing wrong lines when some codes of source codes of the plurality of products are inconsistent. Thus, a patch file generated on the basis of one product can be applied to other products; and compared with the manner of synchronously updating codes in which a patch file is respectively generated for each product and the generated patch file is respectively applied to a corresponding product, the efficiency of synchronously updating codes is greatly increased, and on this basis, semi-automatic processing of synchronously updating codes can be further achieved.

The target character string may includes all or some characters in one code structure block, and the some characters are continuous characters in the code structure block.

Figure 2:
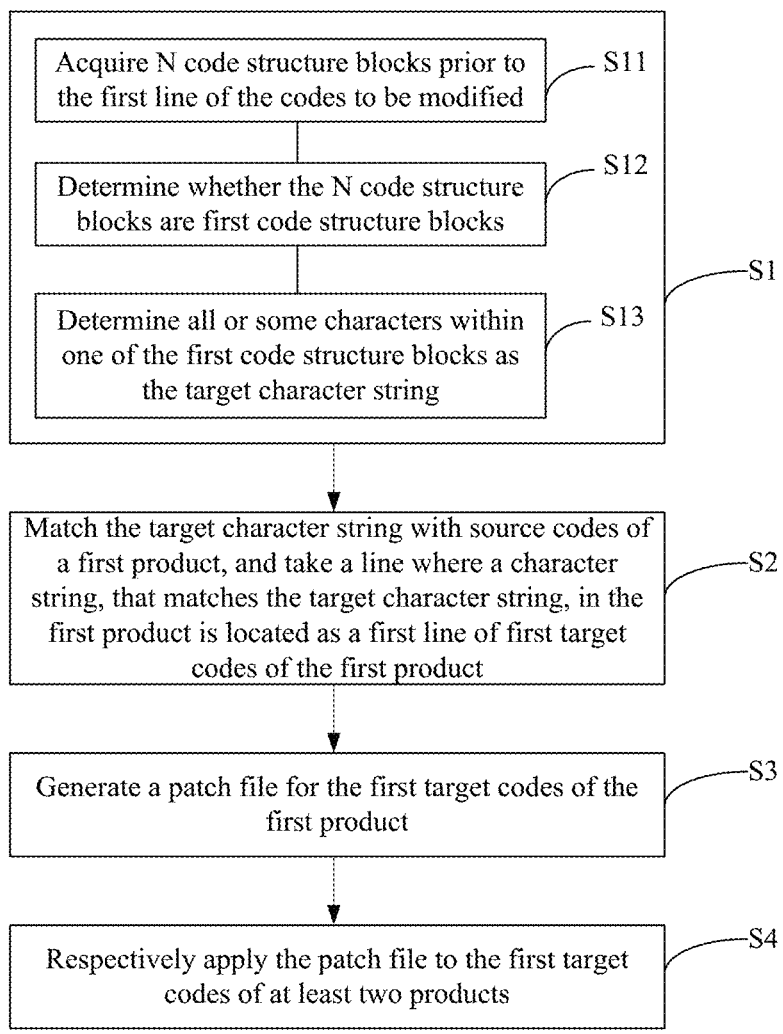
FIG. 2 is a schematic flowchart of another code updating method provided according to embodiments of the present disclosure.

As shown in FIG. 2, which is a schematic flowchart of an embodiment of the present disclosure, the target character string is acquired, i.e. step S1, includes:

step S11: N code structure blocks prior to the first line of the codes to be modified are acquired, wherein N is a positive integer;

step S12: whether the N code structure blocks are first code structure blocks is determined, wherein the first code structure blocks are common code structure blocks of the source codes of the at least two products, and line spacings between the first code structure blocks and the codes to be modified in the source codes of the at least two products are the same; and step S13: all or some characters within one of the first code structure blocks are determined as the target character string.

In some embodiments, if a plurality of first code structure blocks exist in the N code structure blocks, all or some characters in any one of the first code structure blocks may be determined as the target character string; or all or some characters in a first code structure block nearest to the codes to be modified may be determined as the target character string; and also, all or some characters in one of the first code structure blocks may be selected and determined as the target character string as required. For example, in order to avoid matching error, all or some characters in the target code structure block in the plurality of first code structure blocks are determined as the target character string, the target code structure block is unique in the source codes of the at least two products; or there is no same code structure block in the codes before the target code structure block in the source codes of the at least two products. Definitely, if there is only one first code structure block among the N code structure blocks, all or some characters in the first code structure block may be determined as the target character string, and selection of the first code structure block is not needed.

In the embodiments of the present disclosure, an appropriate target character string can be selected, and the appropriate target character string means that the target character string is a common code of source codes of at least two products and has the same line spacing from the codes to be modified in the source codes of the at least two products. Further, the appropriate target character string also satisfies the following condition: the target character string is unique in the source codes of the at least two products, or there is no same character string in the codes before the target character string in the source codes of the at least two products. Thus, a matching error of the target character string can be avoided.

Figure 3:
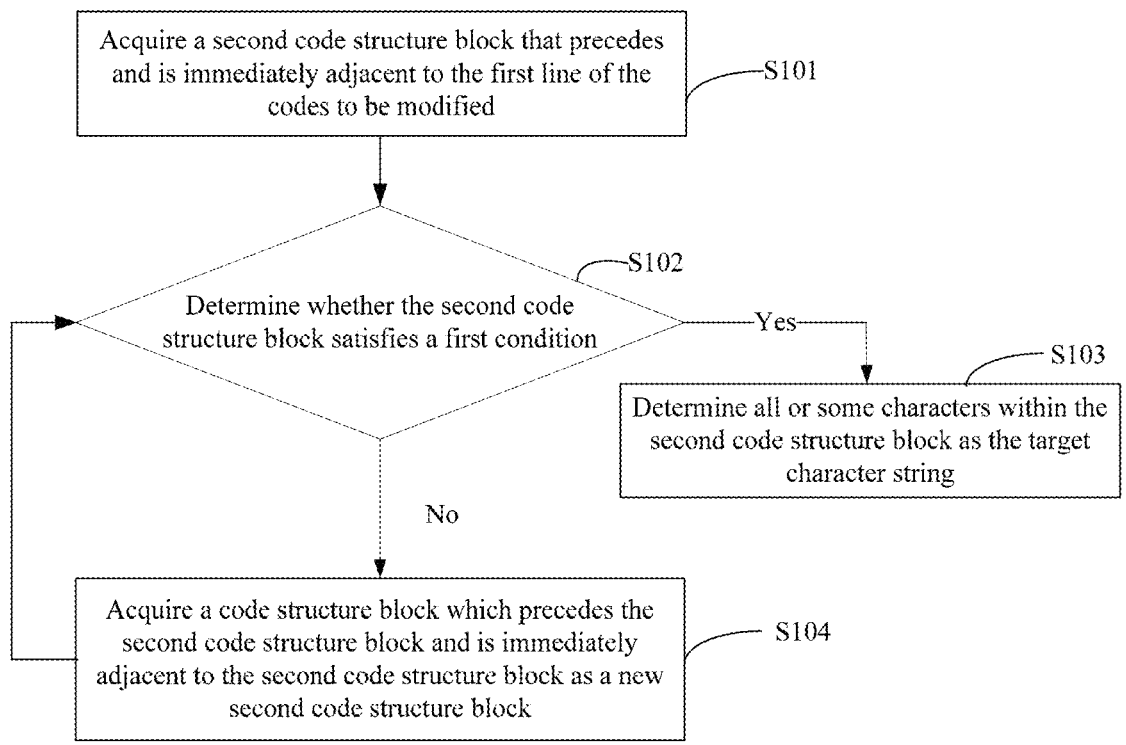
FIG. 3 is a schematic flowchart of acquiring a target character string provided according to embodiments of the present disclosure.

As shown in FIG. 3, which is a schematic flowchart of another embodiment of the present disclosure, the target character string is acquired, i.e. step S1, includes:

step S101: a second code structure block that precedes and is immediately adjacent to the first line of the codes to be modified is acquired;

step S102: whether the second code structure block satisfies a first condition is determined, wherein the first condition includes: the second code structure block is a common code structure block of the source codes of the at least two products, and line spacing between the second code structure block and the codes to be modified is the same in the source codes of the at least two products;

step S103: in cases where the second code structure block satisfies the first condition, all or some characters within the second code structure block are determined as the target character string; and step S104: in cases where the second code structure block does not satisfy the first condition, a code structure block which precedes the second code structure block and is immediately adjacent to the second code structure block is acquired as a new second code structure block; and the steps S102-S104 are repeated until a code structure block that satisfies the first condition is acquired, and all or some characters in the code structure block that satisfies the first condition are determined as the target character string.

That is to say, the process of acquiring the target character string is: starting from a code structure block immediately before the first line of the codes to be modified, forward traversing is performed sequentially; in the traversing process, it is determined whether a currently traversed code structure block satisfies the first condition; if the currently traversed code structure block satisfies the first condition, the traversing process is stopped; and all or some characters in the currently traversed code structure block are determined as the target character string.

In the embodiments of the present disclosure, a character string that is suitable as the target character string and closest to the codes to be modified can be selected as the target character string; and the closer the target character string is to the codes to be modified, the less the number of code lines requiring to be compared when the patch file is generated, and thus the less the amount of processing during comparison is.

Figure 4:
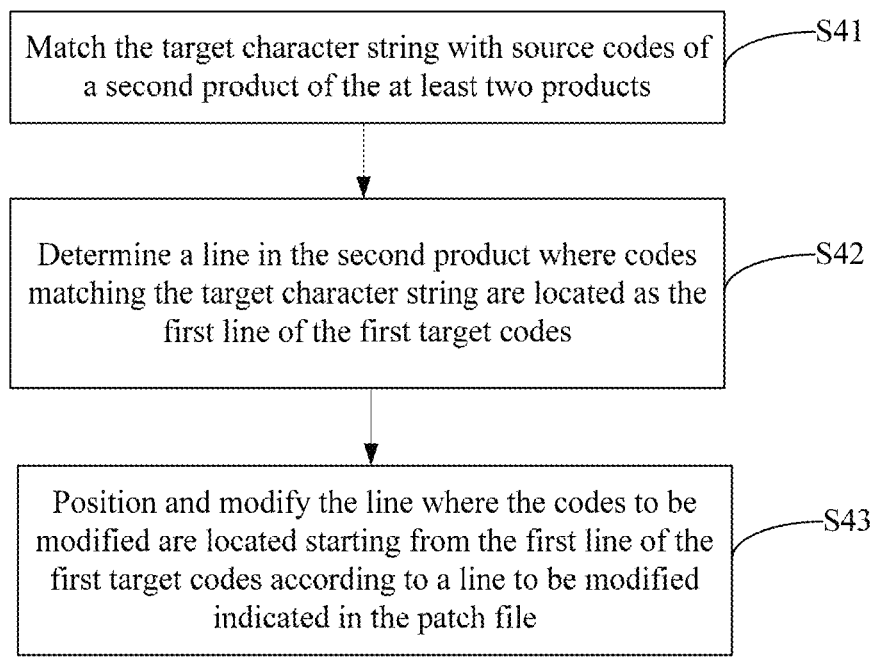
FIG. 4 is a schematic flowchart of applying a patch file according to embodiments of the present disclosure.

As shown in FIG. 4, which is a schematic flowchart of another embodiment of the present disclosure, the patch file is respectively applied to the first target codes of the at least two products, i.e. step S4, includes:

step S41: the target character string is matched with source codes of a second product of the at least two products;

step S42: a line in the second product where codes matching the target character string are located is determined as the first line of the first target codes; and step S43: starting from the first line of the first target codes, according to a line to be modified indicated in the patch file, the line where the codes to be modified are located is positioned and modified.

In the embodiments of the present disclosure, as the target character string has the same line spacing from the codes to be modified in each product, when the patch file generated on the basis of one product is applied to each product, there is no problem of applying to wrong lines, thereby increasing the efficiency of synchronously updating codes of a series of products.

Figure 5:
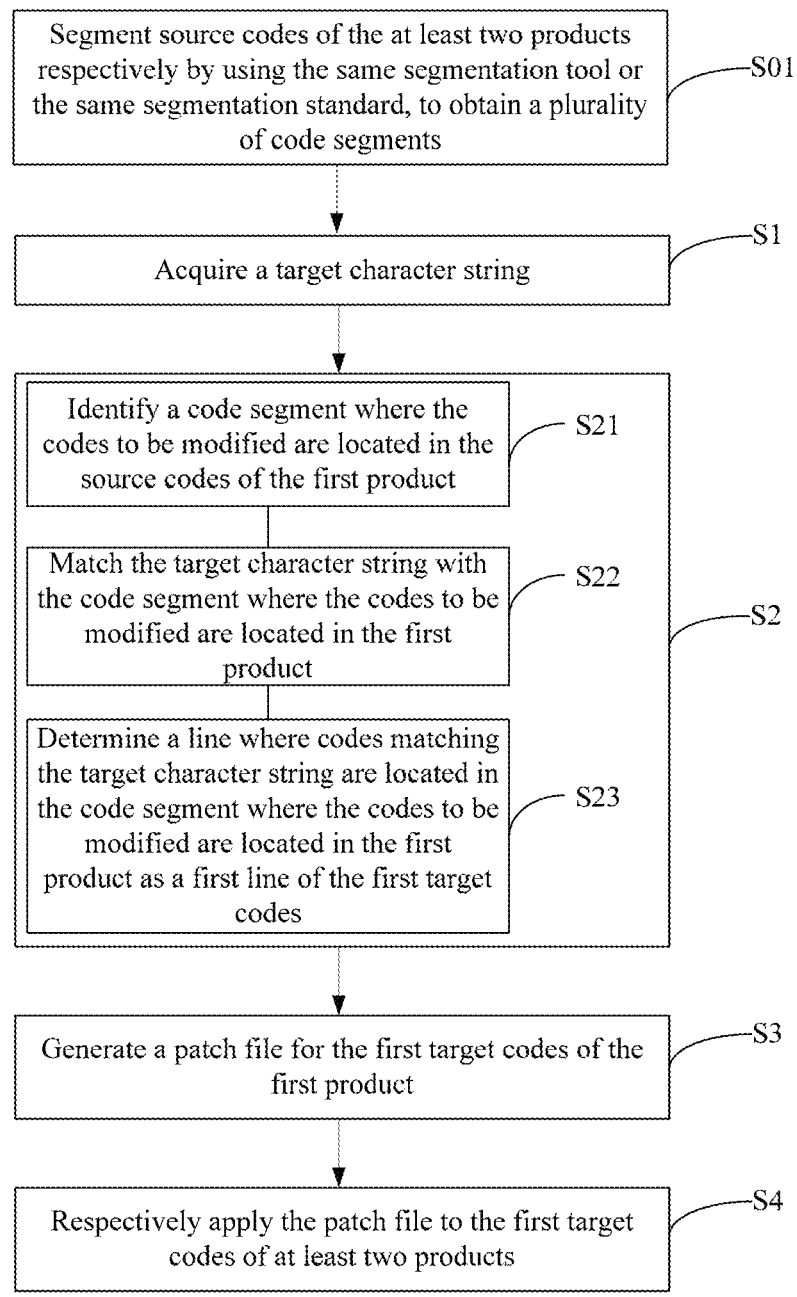
FIG. 5 is a schematic flowchart of still another code updating method provided according to embodiments of the present disclosure.

As shown in FIG. 5, which is a schematic flowchart of another embodiment of the present disclosure, wherein the at least two products use the same basic code base; before the target character string is acquired, the method further includes:

step S01: the source codes of the at least two products are segmented respectively by using the same segmentation tool or the same segmentation standard, to obtain a plurality of code segments;

the target character string is acquired from a code segment where the codes to be modified are located;

the target character string is matched with source codes of the first product, and the line where the character string, that matches the target character string, in the first product is located is taken as the first line of first target codes of the first product, i.e. step S2, includes:

step S21: a code segment where the codes to be modified are located in the source codes of the first product is identified;

step S22: the target character string is matched with the code segment where the codes to be modified are located in the first product; and step S23: a line where codes matching the target character string are located in the code segment where the codes to be modified are located in the first product is determined as the first line of the first target codes, wherein the first target codes further include: all codes following the line where the codes matching the target character string are located in the code segment where the codes to be modified are located in the first product.

In some embodiments, when the source codes are segmented, some existing segmentation technologies may be used, and reference may be made to currently common source code tools, e.g. notepad++ and source insight. A corresponding function in notepad++ is code folding, and after folding, each block is a code segment, reference can be made to the examples as shown in FIGS. 6 and 7, in which FIG. 6 is a schematic diagram before code folding, and FIG. 7 is a schematic diagram after code folding. A corresponding function in source insight is symbol window, the left side relates to extracted symbols, and reference may be made to the example as shown in FIG. 8. Performance of the two are substantially the same, and a function, a macro definition, a global variable definition, etc. are taken as a first-stage segment of the codes.

In the embodiments of the present disclosure, when the patch file is generated, the smallest comparison unit is a code segment in a source code file, and is no longer the entire source code file, and the calculation amount during comparison is small, and the problem of a matching error caused by the fact that there are multiple codes matching the target character string in the entire source code file can be avoided.

In some other embodiments of the present disclosure, the patch file is respectively applied to the first target codes of the at least two products includes:

for the source codes of each of the products, the code segment where the codes to be modified are located is identified;

the target character string is matched with the code segment where the codes to be modified are located;

a line where codes matching the target character string are located in the code segment where the codes to be modified are located is determined as the first line of the first target codes; and starting from the first line of the first target codes, according to a line to be modified indicated in the patch file, the line where the codes to be modified are located is positioned and modified.

In the embodiments of the present disclosure, in the process of applying the patch file, when the target character string is matched, matching is performed only with a corresponding code segment instead of matching with the entire source code file, thereby reducing the calculation amount during matching.

TABLE 1

| 1 | p1_source_v1.c | renaming of a first stage file of a source.c file of a p1 product |
| 2 | p1_source_v2.c | renaming of a second stage file of a source.c file of a p1 product |
| 3 | P2_source_v1.c | renaming of a first stage file of a source.c file of a p2 product |
| 4 | P2_source_v2.c | renaming of a second stage file of a source.c file of a p2 product |

Hereinafter, the methods provided in the embodiments of the present disclosure are described by taking two products as an example.

The existing two products are p1 and p2 respectively, and codes of the two products use the same codebase. The codes of the two products are largely identical but with minor differences, and have a large amount of common codes, the same directory structure file name, and only a small amount of codes are unique to each product. Hereinafter, an exemplary code file is used for illustration, and it is assumed that source codes of the two products are identical and there is currently a file source.c of the same name. Various products and stage renaming of the source.c are as shown in Table 1 above.

Figure 9:
FIG. 9 is a schematic diagram of code difference between two example products.

As shown in FIG. 9, a source code file p1_source_v1.c used by the product p1 differs from a source code file p2_source_v1.c used by the product p2 in respect of the childfunction, and the other parts of the codes are identical.

Figure 10:
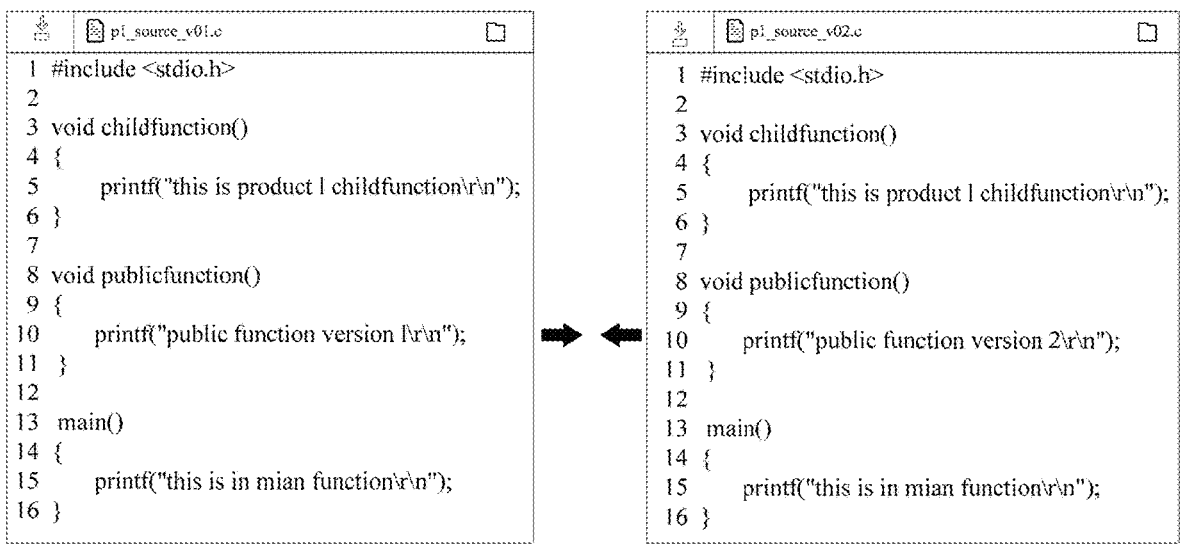
FIG. 10 is a schematic diagram of modification of source codes of an example product p1.

A problem of a public function of the product p1 was found and modified during development. The code modification is as shown in FIG. 10. A corresponding patch file generated by using a diff command is as shown in FIG. 11. This patch file cannot be directly applied to source.c of the product p2, and this problem is repaired and synchronously modified to the product p2.

Figure 13:
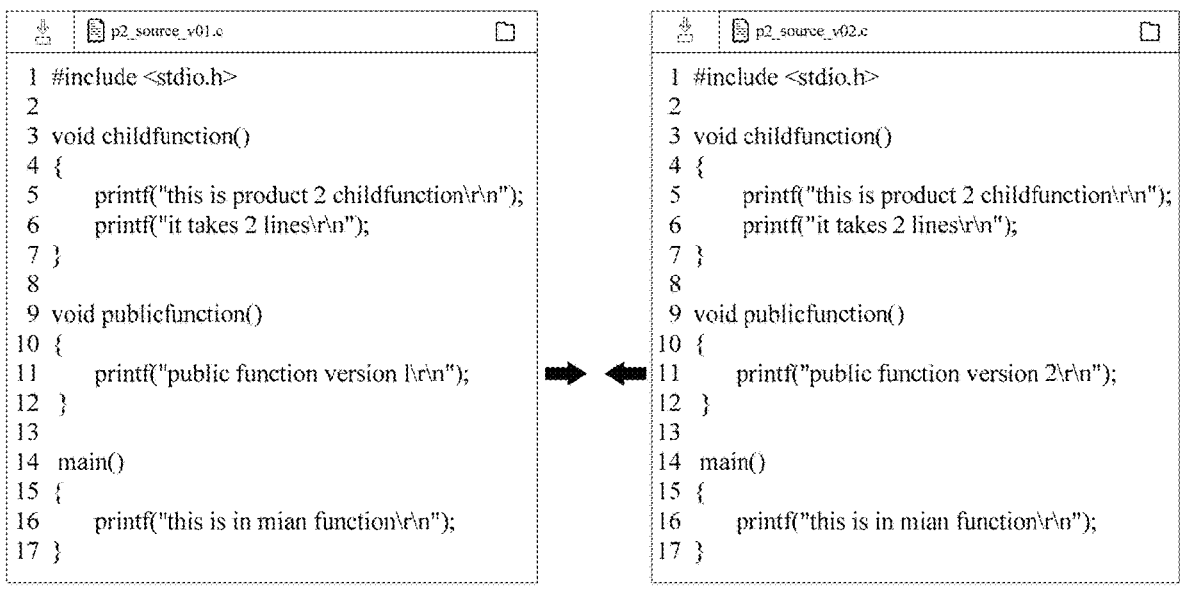
FIG. 13 is a schematic diagram of modification of codes of an example product p2 by using the patch file as shown in FIG. 12.

Upon analyzing the reasons, the patch of source.c of the product p1 cannot be directly applied to the product p2, as there is difference between the two files. Direct applying will result in wrong lines, and the patch cannot be applied. However, if limited within a certain paragraph, the content is the same. For example, in a code segment "void publicfunction( )". Matching may be performed on the character string "void publicfunction( )", and a matched line serves as a first line, and the difference is calculated from this line. FIG. 12 shows diff differences after a specified character string is developed. By applying this difference to p2_source_v1.c of the product p2, and modifying from a third line where the character string is found (3c3), a p2_source_v2.c file can be generated. The source.c code modification of the product p2 is as shown in FIG. 13.

TABLE 2

| 1 | #include<stdio.h> |
| 2 | void childfunction( ) |
| 3 | void publicfunction( ) |

For the confirmation of this matching character string, a code structure block common to the products p1 and p2 above and closest to a code line to be modified can be found. In this example, three code structure blocks (as shown in Table 2) above the code line to be modified are all common code structure blocks of the products p1 and p2, and a code structure block closest to code modification is selected.

In the embodiments of the present disclosure, diff is a very important tool program in a Linux system, and diff is usually used to compare and view files of different versions of the same software (or program). In the diff, "line" is taken as a unit for comparison. The diff and patch are a pair of tools. Mathematically, the diff is a difference operation of two sets, and the patch is a sum operation of two sets. By the diff, differences between two files or a set of files are compared and recorded, to generate a diff file, which is also a patch file commonly referred to. The patch can apply the diff file to one of original two sets, to obtain the other set. For example, file A and file B generate a patch file C after the diff, and this process is equivalent to A−B=C, and then the process of patch is B+C=A or A−C=B. Therefore, as long as any two of the three files A, B and C can be obtained, another file can be generated by using the pair of tools, i.e. the diff and the patch.

Figure 14:
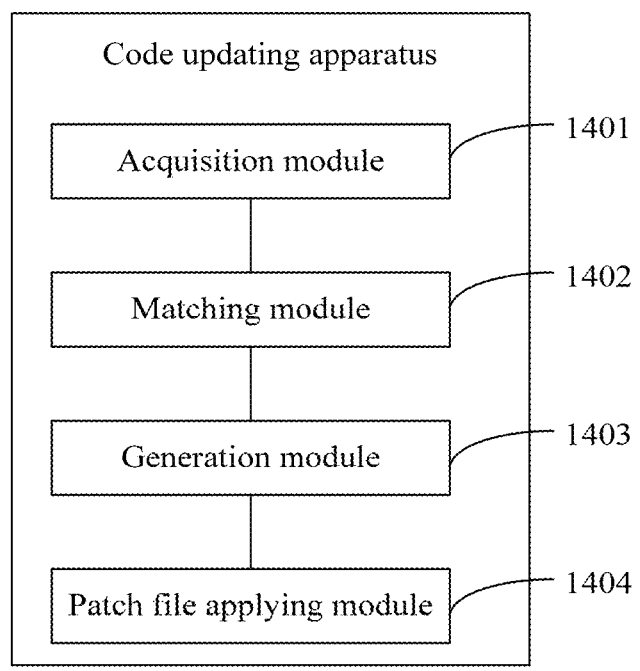
FIG. 14 is a schematic structural diagram of a code updating apparatus provided according to embodiments of the present disclosure.

Correspondingly, as shown in FIG. 14, embodiments of the present disclosure provide a code updating apparatus, includes:

an acquisition module 1401, configured to acquire a target character string, wherein the target character string is a common code of source codes of at least two products, first line spacings in the source codes of the at least two products are the same, and each of the first line spacings is a spacing between a line where the target character string is located and a first line of codes to be modified;

a matching module 1402, configured to match the target character string with source codes of a first product, and take a line where a character string, that matches the target character string, in the first product is located as a first line of first target codes of the first product; wherein the first product is one of the at least two products, and the first target codes at least further include the codes to be modified and codes between the first line and the codes to be modified;

a generation module 1403, configured to generate a patch file for the first target codes of the first product; and a patch file applying module 1404, configured to respectively apply the patch file to the first target codes of the at least two products.

In the embodiments of the present disclosure, when generating the patch file and applying the patch file, the comparison does not start from the first line of the whole source codes of the product, but starts from the line where a specified character string (i.e. the target character string) is located; furthermore, the selection of the specified character string follows the condition that the specified character string includes common codes of a plurality of series products, and line spacings between lines where the specified character string is located in the plurality of series products and a first line of the codes to be modified are the same, thereby avoiding the problem of comparing wrong lines when some codes of source codes of the plurality of products are inconsistent. Thus, a patch file generated on the basis of one product can be applied to other products; and compared with the manner of synchronously updating codes in which a patch file is respectively generated for each product and the generated patch file is respectively applied to a corresponding product, the efficiency of synchronously updating codes is greatly increased, and on this basis, semi-automatic processing of synchronously updating codes can be further achieved.

In some embodiments, the target character string includes all or some characters in one code structure block, and the some characters are continuous characters in the code structure block.

In some embodiments, the acquisition module 1401 includes:
  a first acquisition unit, configured to acquire N code structure blocks prior to the first line of the codes to be modified, wherein N is a positive integer;
  a first judgment unit, configured to determine whether the N code structure blocks are first code structure blocks, wherein the first code structure blocks are common code structure blocks of the source codes of the at least two products, and line spacings between the first code structure blocks and the codes to be modified in the source codes of the at least two products are the same; and
  a first determination unit, configured to determine all or some characters within one of the first code structure blocks as the target character string.

In some embodiments, the acquisition module 1401 includes:
  a second acquisition unit, configured to acquire a second code structure block that precedes and is immediately adjacent to the first line of the codes to be modified;
  a second judgment unit, configured to determine whether the second code structure block satisfies a first condition, wherein the first condition includes: the second code structure block is a common code structure block of the source codes of the at least two products, and line spacing between the second code structure block and the codes to be modified is the same in the source codes of the at least two products;
  a second determination unit, configured to determine, in cases where the second code structure block satisfies the first condition, all or some characters within the second code structure block as the target character string;
  a third acquisition unit, configured to acquire, in cases where the second code structure block does not satisfy the first condition, a code structure block which precedes the second code structure block and is immediately adjacent to the second code structure block as a new second code structure block; and
  a control unit, configured to control the second judgment unit, the second determination unit, and the third acquisition unit to repeatedly run, until a code structure block that satisfies the first condition is obtained, and to determine all or some characters in the code structure block that satisfies the first condition as the target character string.

In some embodiments, the patch file applying module 1404 includes:
  a first matching unit, configured to match the target character string with source codes of a second product of the at least two products;
  a third determination unit, configured to determine a line in the second product where codes matching the target character string are located as the first line of the first target codes; and
  a first modification unit, configured to position and modify the line where the codes to be modified are located starting from the first line of the first target codes according to a line to be modified indicated in the patch file.

In some embodiments, the at least two products use the same basic code base;
  the apparatus further includes:
  a segmentation module, configured to segment the source codes of the at least two products respectively by using the same segmentation tool or the same segmentation standard, to obtain a plurality of code segments;
  the target character string is acquired from a code segment where the codes to be modified are located;
  the matching module 1402 includes:
  a first identification unit, configured to identify a code segment where the codes to be modified are located in the source codes of the first product;
  a second matching unit, configured to match the target character string with the code segment where the codes to be modified are located in the first product; and
  a fourth determination unit, configured to determine a line where codes matching the target character string are located in the code segment where the codes to be modified are located in the first product as the first line of the first target codes, wherein the first target codes further include: all codes following the line where the codes matching the target character string are located in the code segment where the codes to be modified are located in the first product.

In some embodiments, the patch file applying module 1404 includes:
  a second identification unit, configured to identify, for the source codes of each of the products, the code segment where the codes to be modified are located;
  a third matching unit, configured to match the target character string with the code segment where the codes to be modified are located;
  a fifth determination unit, configured to determine a line where codes matching the target character string are located in the code segment where the codes to be modified are located as the first line of the first target codes; and
  a second modification unit, configured to position and modify the line where the codes to be modified are located starting from the first line of the first target codes according to a line to be modified indicated in the patch file.

Embodiments of the present disclosure are product embodiments corresponding to the method embodiments above, and therefore will not be repeated herein. For details, refer to the method embodiments above.

Figure 15:
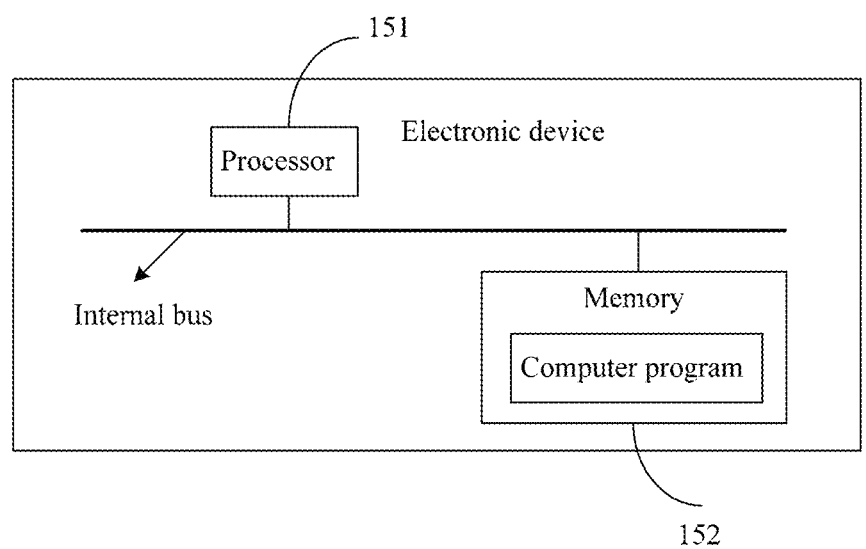
FIG. 15 is a schematic structural diagram of an electronic device provided according to embodiments of the present disclosure.

Embodiments of the present disclosure further provide an electronic device. As shown in FIG. 15, the electronic device may includes a processor 151 and a memory 152, wherein the processor 151 and the memory 152 may be in communication connection with each other by using a bus or in another manner. In FIG. 15, connection by using a bus is taken as an example.

The processor 151 may be a Central Processing Unit (CPU). The processor 151 may also be a chip such as another general processor, a Digital Signal Processor (DSP), an Application Specific Integrated Circuit (ASIC), a Field- Programmable Gate Array (FPGA), or other programmable logic devices, a discrete gate or transistor logic device, or a discrete hardware component, etc., or a combination of the various chips above.

The memory 152 serves as a non-transitory computer-readable Non-Volatile storage medium, and may be configured to store a non-transitory software program, a non-transitory computer-executable program and modules, such as program instructions/modules (e.g. the acquisition module 1401, matching module 1402, generation module 1403, and patch file applying module 1404 as shown in FIG. 14) corresponding to the code updating method in the embodiments of the present disclosure. The processor 151 executes various function applications and data processing of the processor by running the non-transitory software program, instructions and modules which are stored in the memory 152, that is, the code updating method in the method embodiments above is implemented.

The memory 152 may include a program storage area and a data storage area, wherein the program storage area may store an operating system and an application program required by at least one function; and the data storage area may store data created by the processor 151, and the like. In addition, the memory 152 may include a high-speed random access memory, and can further include a non-transitory memory, for example, at least one magnetic disk storage device, a flash memory device, or other non-transitory solid-state storage devices. In some embodiments, the memory 152 includes a memory that is remotely arranged relative to the processor 151, and these remote memories can be connected to the processor 151 via a network. Examples of the network include, but are not limited to the Internet, an intranet, a local area network, a mobile communication network and combinations thereof.

At least one modules are stored in the memory 152, and when executed by the processor 151, the modules execute the code updating method in the embodiments as shown in FIGS. 1-13.

Specific details of the electronic device can be understood with reference to corresponding related illustration and effects in the embodiments as shown in FIGS. 1-13, which will not be repeated herein again.

Embodiments of the present disclosure further provide a Non-Volatile computer-readable storage medium; the Non-Volatile computer-readable storage medium is configured to store a computer program, and when the computer program is executed by a processor, the code updating method is implemented.

The computer-readable medium, includes both permanent and non-permanent, and removable and non-removable medium, may achieve information storage by any method or technique. The information may be computer-readable instructions, data structures, modules of a program, or other data. Examples of the computer storage medium include but are not limited to, phase change memory (PRAM), static random-access memory (SRAM), dynamic random-access memory (DRAM), other types of random-access memories (RAM), read-only memory (ROM), electrically erasable programmable read-only memory (EEPROM), flash memory or other memory technique, compact disc read-only memory (CD-ROM), digital versatile disc (DVD) or other optical storage, magnetic cassettes, magnetic tape magnetic disk storage or other magnetic storage devices, or any other non-transmission media, which may be configured to store information that may be accessed by a computing device. As defined herein, the computer-readable media do not include transitory computer-readable media (transitory media), such as modulated data signals and carriers.

It should also be noted that the terms "include", or any other variations thereof are intended to cover a non-exclusive inclusion, so that a process, method, commodity or device that includes a series of elements not only includes those elements, but also includes other elements that are not explicitly listed, or further includes inherent elements of the process, method, commodity, or device. Without further limitation, an element defined by a sentence "include a . . ." does not exclude other same elements existing in the process, method, commodity, or device that includes the element.

A person skilled in the art would understand that all or some processes of the methods in the described embodiments may be completed by a computer program instructing related hardware. The program can be stored in a computer-readable storage medium, and when the program is executed, the processes in the described various method embodiments can be included. The storage medium may be a magnetic disk, an optical disk, a Read-Only Memory (ROM), a Random Access Memory (RAM), a Flash Memory, a Hard Disk Drive (abbreviated as HDD), or a Solid-State Drive (SSD), or the like; and the storage medium may also include a combination of memories of the described types.

Various embodiments in the description are described in a progressive manner. For the same or similar parts among the embodiments, reference may be made to each other. Each embodiment focuses on differences from other embodiments. In particular, for the apparatus embodiments, as they are basically similar to the method embodiments, the illustration thereof is relatively simple, and for the related parts, reference can be made to the illustration of the method embodiments.

Although the embodiments of the present disclosure are described in conjunction with the drawings, various modifications and variations can be made by those skilled in the art without departing from the spirit and scope of some embodiments of the present disclosure; and all such modifications and variations belong to the scope of protection defined by the appended claims.

What is claimed is:

1. A code updating method, comprising:
    acquiring a target character string, wherein the target character string is a common code of source codes of at least two products, first line spacings in the source codes of the at least two products are the same, and each of the first line spacings is a spacing between a line where the target character string is located and a first line of codes to be modified;
    matching the target character string with source codes of a first product, and taking a line where a character string, that matches the target character string, in the first product is located as a first line of first target codes of the first product; wherein the first product is one of the at least two products, and the first target codes at least further comprise the codes to be modified and codes between the first line and the codes to be modified;
    generating a patch file for the first target codes of the first product; and
    respectively applying the patch file to the first target codes of the at least two products.

2. The method as claimed in claim 1, wherein the first target codes comprise codes of a line where a character string same as the target character string is located in the first product, or all codes after codes of a line where a character string same as the target character string is located in the first product; wherein the character string matching the target character string is a character string same as the target character string.

3. The method as claimed in claim 1, wherein generating the patch file for the first target codes of the first product comprises:
generating a patch file for the first target codes of the first product by using a diff command, wherein the patch file comprises the generated patch file.

4. The method as claimed in claim 1, wherein respectively applying the patch file to the first target codes of the at least two products comprises:
matching the target character string with source codes of each of the at least two products, and applying the patch file by using a line where the character string matching the target character string is located in each of the products as a start line of applying the patch file.

5. The method as claimed in claim 1, wherein the target character string is a unique code in the source codes of the at least two products, or there is no same character string in the codes before the target character string in the source codes of the at least two products.

6. The method as claimed in claim 1, wherein the target character string comprises all or some characters in one code structure block, and the some characters are continuous characters in the code structure block.

7. The method as claimed in claim 6, wherein acquiring the target character string comprises:
acquiring N code structure blocks prior to a first line of the codes to be modified, wherein N is a positive integer;
determining whether the N code structure blocks are first code structure blocks, wherein the first code structure blocks are common code structure blocks of the source codes of the at least two products, and line spacings between the first code structure blocks and the codes to be modified in the source codes of the at least two products are the same; and
determining all or some characters within one of the first code structure blocks as the target character string.

8. The method as claimed in claim 7, wherein before all or some characters within one of the first code structure blocks are determined as the target character string, the method further comprises:
in cases where there is one first code structure block in the N code structure blocks, determining all or some characters within this first code structure block as the target character string; and
in cases where there are a plurality of first code structure blocks in the N code structure blocks, selecting one first code structure block from the plurality of first code structure blocks, and determining all or some characters in the selected one first code structure block as the target character string.

9. The method as claimed in claim 8, wherein selecting one first code structure block from the plurality of first code structure blocks comprises:
selecting any one first code structure block from the plurality of first code structure blocks.

10. The method as claimed in claim 8, wherein selecting one first code structure block from the plurality of first code structure blocks comprises:
selecting, from the plurality of first code structure blocks, one first code structure block nearest the codes to be modified.

11. The method as claimed in claim 8, wherein selecting one first code structure block from the plurality of first code structure blocks comprises:
selecting one first code structure block from the plurality of first code structure blocks according to requirements.

12. The method as claimed in claim 11, wherein selecting one first code structure block from the plurality of first code structure blocks according to requirements comprises:
selecting a target code structure block from the plurality of first code structure blocks, wherein the target code structure block is unique in the source codes of the at least two products, or there is no same code structure block in the codes before the target code structure block in the source codes of the at least two products.

13. The method as claimed in claim 7, wherein acquiring the target character string comprises:
step S101: acquiring a second code structure block that precedes and is immediately adjacent to the first line of the codes to be modified;
step S102: determining whether the second code structure block satisfies a first condition, wherein the first condition comprises: the second code structure block is a common code structure block of the source codes of the at least two products, and line spacing between the second code structure block and the codes to be modified is the same in the source codes of the at least two products;
step S103: determining, in cases where the second code structure block satisfies the first condition, all or some characters within the second code structure block as the target character string;
step S104: acquiring, in cases where the second code structure block does not satisfy the first condition, a code structure block which precedes the second code structure block and is immediately adjacent to the second code structure block as a new second code structure block; and
executing the steps S102-S104 repeatedly until a code structure block that satisfies the first condition is acquired, and determining all or some characters in the code structure block that satisfies the first condition as the target character string.

14. The method as claimed in claim 1, wherein respectively applying the patch file to the first target codes of the at least two products comprises:
matching the target character string with source codes of a second product of the at least two products;
determining a line in the second product where codes matching the target character string are located as the first line of the first target codes; and
starting from the first line of the first target codes, positioning and modifying the line where the codes to be modified are located according to a line to be modified indicated in the patch file.

15. The method as claimed in claim 1, wherein the at least two products use the same basic code base;
before the target character string is acquired, the method further comprises:
segmenting the source codes of the at least two products respectively by using the same segmentation tool or the same segmentation standard, to obtain a plurality of code segments;
wherein the target character string is acquired from a code segment where the codes to be modified are located; and
matching the target character string with source codes of the first product, and taking the line where the character string, that matches the target character string, in the first product is located as the first line of first target codes of the first product comprises:
identifying a code segment where the codes to be modified are located in the source codes of the first product;
matching the target character string with the code segment where the codes to be modified are located in the first product; and
determining a line where codes matching the target character string are located in the code segment where the codes to be modified are located in the first product as the first line of the first target codes, wherein the first target codes further comprise: all codes following the line where the codes matching the target character string are located in the code segment where the codes to be modified are located in the first product.

16. The method as claimed in claim 15, wherein segmenting the source codes of the at least two products respectively by using the same segmentation tool or the same segmentation standard, to obtain the plurality of code segments comprises:
segmenting the source codes of the at least two products by using a code folding function in notepad++, to obtain the plurality of code segments; or,
segmenting the source codes by using a symbol window function in source insight, to obtain the plurality of code segments.

17. The method as claimed in claim 15, wherein respectively applying the patch file to the first target codes of the at least two products comprises:
identifying, for the source codes of each of the products, the code segment where the codes to be modified are located;
matching the target character string with the code segment where the codes to be modified are located;
determining a line where codes matching the target character string are located in the code segment where the codes to be modified are located as the first line of the first target codes; and
starting from the first line of the first target codes, positioning and modifying the line where the codes to be modified are located according to a line to be modified indicated in the patch file.

18. An electronic device, comprising:
a memory and a processor, wherein the memory and the processor are in communication connection with each other; the memory is configured to store a computer program; and when the computer program is executed by the processor, cause the processor to:
acquire a target character string, wherein the target character string is a common code of source codes of at least two products, first line spacings in the source codes of the at least two products are the same, and each of the first line spacings is a spacing between a line where the target character string is located and a first line of codes to be modified;
match the target character string with source codes of a first product, and take a line where a character string, that matches the target character string, in the first product is located as a first line of first target codes of the first product; wherein the first product is one of the at least two products, and the first target codes at least further comprise the codes to be modified and codes between the first line and the codes to be modified;
generate a patch file for the first target codes of the first product; and
respectively apply the patch file to the first target codes of the at least two products.

19. A non-transitory computer-readable storage medium, wherein the computer-readable storage medium is configured to store a computer program, and when the computer program is executed by a processor, the code updating method according to claim 1 is implemented.

20. The electronic device as claimed in claim 18, wherein the first target codes comprise codes of a line where a character string same as the target character string is located in the first product, or all codes after codes of a line where a character string same as the target character string is located in the first product; wherein the character string matching the target character string is a character string same as the target character string.

* * * * *